(12) United States Patent
Tsuji et al.

(10) Patent No.: US 7,622,419 B2
(45) Date of Patent: Nov. 24, 2009

(54) FILTER CATALYST

(75) Inventors: Makoto Tsuji, Kakegawa (JP); Daisuke Oki, Kakegawa (JP); Seiji Okawara, Toyota (JP)

(73) Assignees: Cataler Corporation, Shizuoka (JP); Toyota Jidosha Kabushiki Kaisha, Toyota (JP)

( * ) Notice: Subject to any disclaimer, the term of this patent is extended or adjusted under 35 U.S.C. 154(b) by 509 days.

(21) Appl. No.: 10/587,984

(22) PCT Filed: Feb. 10, 2005

(86) PCT No.: PCT/JP2005/002656

§ 371 (c)(1),
(2), (4) Date: Aug. 3, 2006

(87) PCT Pub. No.: WO2005/075053

PCT Pub. Date: Aug. 18, 2005

(65) Prior Publication Data

US 2008/0025882 A1      Jan. 31, 2008

(30) Foreign Application Priority Data

Feb. 10, 2004   (JP) .............................. 2004-033924

(51) Int. Cl.
| | |
|---|---|
| B01J 23/00 | (2006.01) |
| B01J 23/02 | (2006.01) |
| B01J 23/40 | (2006.01) |
| B01J 23/42 | (2006.01) |
| B01J 23/44 | (2006.01) |
| B01J 23/56 | (2006.01) |
| B01J 21/04 | (2006.01) |

(52) U.S. Cl. ................... 502/326; 502/327; 502/332; 502/333; 502/334; 502/339; 502/349; 502/350; 502/439

(58) Field of Classification Search ............... 502/325, 502/326, 327, 332, 333, 334, 339, 349, 350, 502/439
See application file for complete search history.

(56) References Cited

U.S. PATENT DOCUMENTS

| | | | | |
|---|---|---|---|---|
| 4,749,671 A | * | 6/1988 | Saito et al. | 502/64 |
| 5,075,274 A | * | 12/1991 | Kiyohide et al. | 502/303 |
| 5,217,939 A | * | 6/1993 | Campbell | 502/339 |
| 5,254,519 A | * | 10/1993 | Wan et al. | 502/252 |
| 5,320,999 A | * | 6/1994 | Muramatsu et al. | 502/303 |
| 5,376,610 A | * | 12/1994 | Takahata et al. | 502/66 |
| 5,439,865 A | * | 8/1995 | Abe et al. | 502/333 |
| 5,459,119 A | * | 10/1995 | Abe et al. | 502/326 |
| 5,627,124 A | * | 5/1997 | Farrauto et al. | 502/304 |
| 5,643,543 A | * | 7/1997 | Guibard et al. | 423/213.5 |
| 5,801,114 A | * | 9/1998 | Durand et al. | 502/302 |

(Continued)

FOREIGN PATENT DOCUMENTS

| | | |
|---|---|---|
| EP | 1 293 241 A2 | 3/2003 |
| JP | A-08-332329 | 12/1996 |
| JP | A-09-158710 | 6/1997 |
| JP | A-09-173866 | 7/1997 |
| JP | A-09-220423 | 8/1997 |

(Continued)

*Primary Examiner*—Cam N Nguyen
(74) *Attorney, Agent, or Firm*—Oliff & Berridge, PLC

(57) ABSTRACT

To provide a filter catalyst in which the closure of ventilation holes by a catalytic layer is inhibited. A filter catalyst of the present invention is characterized in that it has pores of 1-20 μm in a porosity of 11% or more. The filter catalyst of the present invention has an effect of being capable of inhibiting the rise of pressure loss when sufficient particulates deposit.

3 Claims, 4 Drawing Sheets

U.S. PATENT DOCUMENTS

| | | | |
|---|---|---|---|
| 6,139,808 A * | 10/2000 | Mizuno et al. | 422/180 |
| 6,165,934 A * | 12/2000 | Gardner et al. | 502/330 |
| 6,500,392 B2 * | 12/2002 | Mizuno et al. | 422/177 |
| 6,511,642 B1 * | 1/2003 | Hatanaka et al. | 423/239.1 |
| 6,667,018 B2 * | 12/2003 | Noda et al. | 423/213.5 |
| 6,750,168 B2 * | 6/2004 | Yan et al. | 502/79 |
| 6,815,393 B2 * | 11/2004 | Noda et al. | 502/243 |
| 6,869,573 B2 * | 3/2005 | Abe et al. | 422/180 |
| 6,921,738 B2 * | 7/2005 | Hwang et al. | 502/240 |
| 6,926,875 B2 * | 8/2005 | Hatanaka et al. | 423/239.1 |
| 7,306,771 B2 * | 12/2007 | Okawara | 422/177 |
| 2003/0024220 A1 | 2/2003 | Ishihara et al. | |
| 2004/0018123 A1 | 1/2004 | Okawara et al. | |

FOREIGN PATENT DOCUMENTS

| | | |
|---|---|---|
| JP | A-09-276708 | 10/1997 |
| JP | A-2000-202307 | 7/2000 |
| JP | A-2001-187344 | 7/2001 |
| JP | A-2002-295228 | 10/2002 |
| JP | A 2002-349234 | 12/2002 |
| JP | A 2002-361047 | 12/2002 |
| JP | A-2003-161137 | 6/2003 |
| JP | A-2004-019498 | 1/2004 |
| JP | A-2004-076717 | 3/2004 |

* cited by examiner

FILTER CATALYST

TECHNICAL FIELD

The present invention relates to a filter catalyst which removes particulates at least, particulates which are one of substances included in exhaust gases emitted from internal combustion engines, such as diesel engines, to purify the exhaust gases.

BACKGROUND ART

In exhaust gases which are emitted from internal combustion engines, such as diesel engines, particulates are included. In the particulates, substances which are harmful to human bodies are included, and it has become an environmental assignment to remove them.

For removing the particulates, filter catalysts have been used. Filter catalysts are set forth in Japanese Unexamined Patent Publication (KOKAI) No. 8-332,329, Japanese Unexamined Patent Publication (KOKAI) No. 9-158,710, Japanese Unexamined Patent Publication (KOKAI) No. 9-173,866, Japanese Unexamined Patent Publication (KOKAI) No. 9-220,423, Japanese Unexamined Patent Publication (KOKAI) No. 9-276,708, Japanese Unexamined Patent Publication (KOKAI) No. 2002-295,228, and Japanese Unexamined Patent Publication (KOKAI) No. 2001-187,344, for example.

A conventional filter catalyst has a construction in which a catalytic layer comprising a loading layer composed of alumina, and the like, and a catalytic metal loaded on the loading layer is formed on a catalyst-support substrate composed of porous ceramic having chained pores. And, when exhaust gases pass the ventilation holes formed out of the chained pores of the catalyst-support substrate, the filter catalyst captures the particulates. The catalytic layer decomposes the captured particulates. At this moment, if the ventilation holes which have opening diameters to such an extent that the exhaust gases can pass are not formed in the filter catalyst, the captured particulates deposit so that the pressure loss is generated when the exhaust gases pass. When the ventilation holes are enlarged in order to inhibit the pressure loss, it becomes impossible to capture the particulates.

The conventional filter catalyst has a problem in that the catalytic layer, formed on the catalytic-support substrate, has narrowed down the opening diameters of pores so that the ventilation holes have come not to have sufficient opening diameters or the ventilation holes have come not to be opened (have been closed). Specifically, the catalytic layer of the filter catalyst is produced by preparing a slurry containing alumina and the like, coating this slurry onto a catalyst-support substrate, drying and calcining it to form a loading layer, and thereafter loading a catalytic metal thereon. During the application of the slurry onto the catalyst-support substrate, since the slurry does not disperse deep inside the pores of the catalyst-support substrate sufficiently, it comes to present adjacent to the opening of the pores of the catalyst-support substrate in a deviated manner. Since the catalytic layer is formed by drying and calcining it in this state, the diametric reduction or closure of the opening of the ventilation holes occurs so that it has become impossible to form sufficient ventilation holes as a filter catalyst.

DISCLOSURE OF THE INVENTION

The present invention has been done in view of the aforementioned circumstances, and it is an assignment to provide a filter catalyst in which the closure of the ventilation holes by the catalytic layer is inhibited.

The inventors of the present invention inquired into filter catalysts over and over again, as a result, they have completed the present invention by focusing their attention on the fact that pores of several micrometers in size make deposited particulates generate a pressure loss when particulates are captured and then deposited.

A filter catalyst of the present invention is characterized in that, in a filter catalyst comprising: a catalyst-support substrate composed of a heat-resistant porous structure having chained pores; and a catalytic layer for burning particulates and formed on a surface of the catalyst-support substrate; the filter catalyst has pores of 1-20 μm in a porosity of 11% or more. Note that, in the present invention, measurement values measured by using a mercury penetration method were adopted as the pore diameter and the porosity.

It is preferable that the catalytic layer has the loading layer formed by preparing a slurry of a heat-resistant oxide powder, coating the slurry onto the catalyst-support substrate, and drying and calcining the slurry in which the heat-resistant oxide powder whose particle diameters are 1 μm or less is contained by 70% by weight or more when the entire amount of the powder dispersed in the slurry was taken as 100% by weight.

The heat-resistant oxide powder dispersed in the slurry can preferably be such that a 70% particle-diameter value (D70) of a particle-diameter cumulative distribution is 1 μm or less.

BEST MODE FOR CARRYING OUT THE INVENTION

Figure 1:
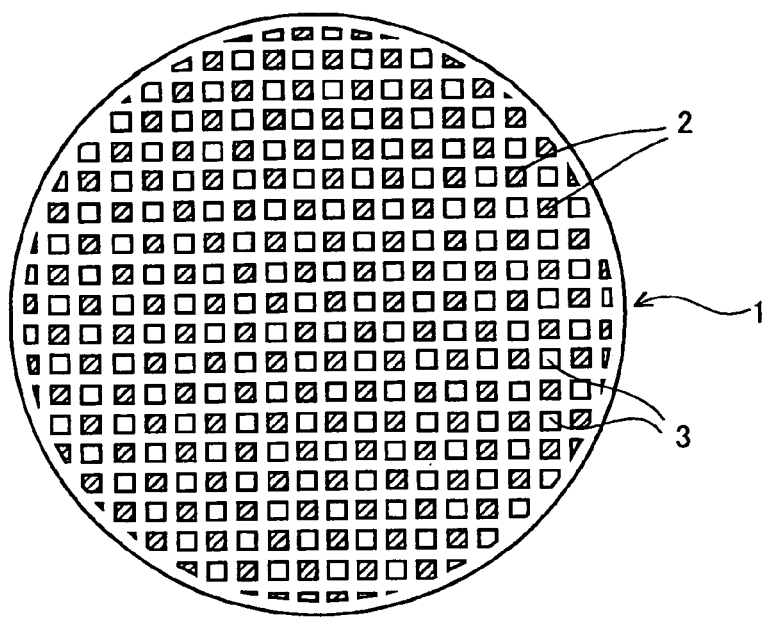
FIG. 1 is a top-surface diagram for illustrating an opposite end-surface of a catalyst-support substrate.

Hereinafter, regarding inventions which further concretize said invention and the embodiment modes of these inventions, they will be described.

Mode for Carrying out the Invention

A filter catalyst of the present invention comprises a catalytic-support substrate, and a catalytic layer.

The catalyst-support substrate is composed of a heat-resistant porous structure which has chained pores. Ventilation holes, through which exhaust gases pass, are formed out of the continuous pores of the catalyst-support substrate.

The catalytic layer is formed on a surface of the catalyst-support substrate, captures particulates, and at the same time burns the captured particulates. Since the catalytic layer captures particulates and burns them, it is possible to remove particulates in exhaust gases.

The filter catalyst of the present invention has pores of 1-20 μm in a porosity of 11% or more. By having pores of 1-20 μm in a porosity of 11% or more, the filter catalyst of the present invention can capture particulates without making the pressure loss rise, and become capable of burning captured particulates.

Specifically, in the filter catalyst, exhaust gases pass through ventilation holes formed out of the pores of the catalyst-support substrate which open in cellular walls of the filter catalyst. And, in this instance, particulates are captured by the catalytic layer. And, pores, particularly whose pore diameters are 20 μm or less, contribute to the capture of particulates. By restricting pores so as to have pores whose pore diameters are 1-20 μm or less being in a high porosity such as of 11% or more, the filter catalyst of the present invention can remove the particulates without making the pressure loss rise remarkably.

The catalytic layer is not limited in particular, as far as the filter catalyst can burn captured particulates. The catalytic layer can preferably comprise a loading layer, composed of a heat-resistant inorganic oxide, and a catalytic metal, loaded on the loading layer.

As for the heat-resistant inorganic oxide forming the loading layer, it is possible to name one or more members selected from the group consisting of transition metal oxides, such as $Al_2O_3$, $SiO_2$, $TiO_2$, $ZrO_2$ and $CeO_2$, rare-earth element oxides, alkali metal oxides, alkaline-earth metal oxides, and composite oxide of these. Moreover, as for the catalytic metal, it is possible to name at least one member selected from precious metals, such as Pt, Pd, Rh, Ir, Ag and Au.

It is preferable that the catalytic layer has the loading layer formed by preparing a slurry of a heat-resistant oxide powder, coating the slurry onto the catalyst-support substrate, and drying and calcining the slurry in which the heat-resistant oxide powder whose particle diameters were 1 μm or less is contained by 70% by weight or more, when the entire amount of the powder dispersed in the slurry was taken as 100% by weight. The loading layer is formed by using the slurry which contains 70% by weight or more of the heat-resistant oxide powder whose particle diameters were 1 μm or less, such that the pore diameters of the ventilation holes in the catalytic layer can be restricted.

More specifically, since particle diameters of the heat-resistant oxide powder constituting the slurry is restricted, it becomes possible to coat the slurry in a uniform thickness on the surface of the catalyst-support substrate, and the loading layer formed by drying and calcining the slurry comes to have the pores having predetermined diameters. That is, since the catalytic layer can be formed in the uniform thickness on the surface of the pores of the catalyst-support substrate iteself, the catalytic layer comes not to close the pores of the catalyst-support substrate and comes to have the predetermined diameters.

Moreover, when the catalytic layer has the loading layer formed by preparing a slurry of a heat-resistant oxide powder, coating the slurry onto the catalyst-support substrate, and drying and calcining the slurry, it is preferable that the heat-resistant oxide powder dispersed in the slurry can preferably be such that a 70% particle-diameter value (D70) of a particle-diameter cumulative distribution is 1 μm or less. Since the slurry composed of a heat-resistant oxide powder having small particle diameters can enter deep inside the pores of the catalyst-support substrate with ease, it comes to be coated in a uniform thickness on the surface of the catalyst-support substrate including the inner surface of the pores. And, pores with the predetermined diameters can be formed by drying and calcining the slurry coated in the uniform thickness on the surface of the catalyst-support substrate.

Moreover, the catalyst-support substrate is one in which the catalytic layer is formed on the surface, and it is not limited in particular as far as it is a substrate which can form pores with desired pore diameters when the catalytic layer is formed. The catalyst-support substrate can preferably have pores whose pore diameters are 10 μm or more in a porosity of 50% or more, and can further preferably have pores whose pore diameters are 20 μm or more in a porosity of 40% or more. Note that the upper limit of the pore diameters of the pores of the catalyst-support substrate is not limited in particular, however, it becomes difficult to form the pore diameters of desired sizes in the catalytic layer when they become large excessively.

Moreover, the catalyst-support substrate can use substrates which have been used as catalyst-support substrates in the conventional filter catalysts. For example, it is possible to use wall-flow DPF (diesel particulates filter), which is composed of cordierite, SiC or the other heat-resistant ceramic, ceramic foam filters, and metallic nonwoven-cloth DPF.

As far as the filter catalyst of the present invention comprises a catalyst-support substrate and a catalytic layer, and comprises the aforementioned arrangement, the material and production process are not limited in particular.

As for the heat-resistant inorganic oxide forming the loading layer, it is possible to name one or more members selected from the group consisting of transition metal oxides, such as $Al_2O_3$, $SiO_2$, $TiO_2$, $ZrO_2$ and $CeO_2$, rare-earth element oxides, alkali metal oxides, alkaline-earth metal oxides, and composite oxide of these. Moreover, as for the catalytic metal, it is possible to name at least one member selected from precious metals, such as Pt, Pd, Rh, Ir, Ag and Au.

The filter catalyst of the present invention can be produced by the following production process, for instance.

First of all, a slurry was prepared from an oxide, which became a raw material for the loading layer. In this instance, the oxide constituting the slurry was prepared so that particles whose particle diameters were 1 μm or less became 70% by weight or more when the entire amount of the oxide was taken as 100% by weight.

This slurry was coated onto the catalyst-support substrate. The coating amount (conversion into oxide particles) per 1-litter (apparent) volume of the catalyst-support substrate can preferably be 150 g or less when particles whose particle diameters are 1 μm or less is 70-90% by weight; when they exceed 90% by weight, it can preferably be 200 g or less. The coating amount of the slurry is calculated based on the weights before and after the coating.

The coating of the slurry onto the catalyst-support substrate is done by blowing off the redundant slurry after applying the slurry onto the surface of the catalyst-support substrate and calcining it after drying the slurry. The loading layer was formed by the coating of the slurry. Subsequently, it is immersed into a catalytic-metal aqueous solution, and was calcined to load the catalytic metal.

In accordance with the above procedures, it is possible to produce the filter catalyst of the present invention.

EXAMPLES

Hereinafter, the present invention will be described using examples.

As an example of the present invention, a production of a filter catalyst was carried out.

Example No. 1

First of all, 150-g alumina ($Al_2O_3$) powder and 200-g water were weighed. The alumina powder was charged into the water and dispersed therein by stirring, and was subjected to wet milling, thereby preparing a slurry. When the entire alumina powder was taken as 100% by weight, particles whose particle diameters were 1 μm or less became 77%.

Subsequently, the slurry was coated on a catalyst-support substrate. The catalyst-support substrate is a catalyst-support substrate (produced by DENSO Corp.) which has axially-extending cells demarcated by cellular walls whose thickness is 300 μm in a quantity of 48 cells/$cm^2$ (about 300 cells/$inch^2$), which is formed as a cylinder shape substantially, whose apparent volume is 35 $cm^3$, and which is made of cordierite. This catalyst-support substrate 1 is such that one of the two openings, which are formed at the both opposite ends of the respective cells, is sealed alternately with a sealing material 2. That is, about half of the large number of the cells are opened in one of the opposite end-surfaces, and the rest of them are opened in the other one of the opposite end-surfaces. In the opposite end-surfaces of the catalyst-support substrate 1, the sealed cells 2 and the opened cells 3 are lined up alternately. Therefore, the opposite end-surfaces of the catalyst-support substrate 1 become like checkered patterns. An opposite end-surface of the catalyst-support substrate 1 is illustrated in FIG. 1.

The coating of the slurry onto the catalyst-support substrate was carried out by immersing the catalyst-support substrate into the slurry, removing the excessive slurry after taking it up therefrom, and thereafter drying and calcining it. Note that, in the present example, the removal of the excessive slurry was done by repeating a pressure fluctuation, in which the slurry was suctioned by holding it in such a state that one of the opposite ends was adapted to the atmospheric pressure and the other one of the opposite ends was adapted to a pressure of (the atmospheric pressure—10 KPa) so that the pressure difference between both opposite ends became 10 KPa for 5-30 seconds; and thereafter holding it for 5-30 seconds after putting the pressure of the other one of the opposite ends back to the atmospheric pressure side. This pressure fluctuation was repeated until the slurry applied on the catalyst-support substrate became a predetermined weight. Note that, during the production of the present example, since the suction of the slurry was carried out through the respective opposite-end sides of both opposite ends, the pressure fluctuation was done twice. Moreover, the calcination was carried out by heating it at 500° C. for 1 hour.

When the weight of the catalyst-support substrate with the slurry coated was weighed, the alumina was loaded in a loading amount of 150 g per 1-liter apparent volume of the catalyst-support substrate.

And, a Pt nitrate aqueous solution including Pt in an amount of 1.5 g/L was prepared, and the catalyst-support substrate with the slurry coated was immersed into it, and was dried after taking it up therefrom. The drying was carried out by heating it at 350° C. for 1 hour. The Pt was loaded in a loading amount of 3 g per 1-liter apparent volume of the catalyst-support substrate. This Pt carries out the combustion of particulates as a catalytic component.

And, a Ba acetate aqueous solution including Ba in an amount of 50 g/L was prepared, and the catalyst-support substrate with the slurry coated was immersed into it, and was dried and calcined after taking it up therefrom. The calcination was carried out by heating it at 500° C. for 1 hour. The Ba was loaded in a loading amount of 13.7 g (0.1 mol) per 1-liter apparent volume of the catalyst-support substrate. Note that this Ba works as a NOx sorbing component in filter catalysts.

In accordance with the above procedures, a filter catalyst of Example No. 1 was produced.

Example No. 2

Except that alumina of the slurry was formed of titania ($TiO_2$) alone, a filter catalyst of the present example was produced in the same manner as that of Example No. 1.

First of all, 150-g titania powder and 200-g water were weighed. The titania powder was charged into the water and dispersed therein by stirring, and was subjected to wet milling, thereby preparing a slurry. When the entire titania powder was taken as 100% by weight, particles whose particle diameters were 1 μm or less became 85%.

The slurry was coated onto the same catalyst-support substrate as the one used in Example No. 1. The coating of the slurry onto the catalyst-support substrate was carried out by immersing the catalyst-support substrate into the slurry, removing the excessive slurry after taking it up therefrom, and thereafter drying and calcining it. Note that, in the present example, the removal of the slurry was done by repeating a pressure fluctuation, in which the slurry was suctioned by holding it in such a state that one of the opposite ends was adapted to the atmospheric pressure and the other one of the opposite ends was adapted to a pressure of (the atmospheric pressure—10 KPa) so that the pressure difference between both opposite ends became 10 KPa for 5-30 seconds; and thereafter holding it for 5-30 seconds after putting the pressure of the other one of the opposite ends back to the atmospheric pressure. This pressure fluctuation was repeated until the slurry applied on the catalyst-support substrate became a predetermined weight. Note that, during the production of the present example, the pressure fluctuation was done twice similarly to the instance of Example No. 1. Moreover, the calcination was carried out by heating it at 500° C. for 1 hour.

When the weight of the catalyst-support substrate with the slurry coated was weighed, it was increased by 5.3 g more than prior to the coating of the slurry. That is, the titania was loaded in a loading amount of 150 g per 1-liter apparent volume of the catalyst-support substrate.

And, a Pt nitrate aqueous solution including Pt in an amount of 1.5 g/L was prepared, and the catalyst-support substrate with the slurry coated was immersed into it, and was dried after taking it up therefrom. The drying was carried out by heating it at 350° C. for 1 hour. The Pt was loaded in a loading amount of 3 g per 1-liter apparent volume of the catalyst-support substrate. This Pt carries out the combustion of particulates as a catalytic component.

And, a Ba acetate aqueous solution including Ba in an amount of 50 g/L was prepared, and the catalyst-support substrate with the slurry coated was immersed into it, and was dried and calcined after taking it up therefrom. The calcination was carried out by heating it at 500° C. for 1 hour. The Ba was loaded in a loading amount of 13.7 g (0.1 mol) per 1-liter apparent volume of the catalyst-support substrate. Note that this Ba works as a NOx sorbing component in filter catalysts.

In accordance with the above procedures, a filter catalyst of Example No. 2 was produced.

Example No. 3

Except that the coating amount of alumina of the slurry was adapted to 75 g, a filter catalyst of the present example was produced in the same manner as that of Example No. 1.

First of all, 150-g alumina powder and 200-g water were weighed. The alumina powder was charged into the water and dispersed therein by stirring, and was subjected to wet milling, thereby preparing a slurry. When the entire alumina powder was taken as 100% by weight, particles whose particle diameters were 1 μm or less became 77%.

The slurry was coated onto the same catalyst-support substrate as the one used in Example No. 1. The coating of the slurry onto the catalyst-support substrate was carried out by immersing the catalyst-support substrate into the slurry, removing the excessive slurry after taking it up therefrom, and thereafter drying and calcining it. Note that, in the present example, the removal of the excessive slurry was done by repeating a pressure fluctuation, in which the slurry was suctioned by holding it in such a state that one of the opposite ends was adapted to the atmospheric pressure and the other one of the opposite ends was adapted to a pressure of (the atmospheric pressure—10 KPa) so that the pressure difference between both opposite ends became 10 KPa for 5-30 seconds; and thereafter holding it for 5-30 seconds after putting the pressure of the other one of the opposite ends back to the atmospheric pressure. This pressure fluctuation was repeated until the slurry applied on the catalyst-support substrate became a predetermined weight. Note that, during the production of the present example, the pressure fluctuation was done four times. Moreover, the calcination was carried out by heating it at 500° C. for 1 hour.

When the weight of the catalyst-support substrate with the slurry coated was weighed, it was increased by 2.6 g more than prior to the coating of the slurry. That is, the alumina was loaded in a loading amount of 75 g per 1-liter apparent volume of the catalyst-support substrate.

And, a Pt nitrate aqueous solution including Pt in an amount of 1.5 g/L was prepared, and the catalyst-support substrate with the slurry coated was immersed into it, and was dried after taking it up therefrom. The drying was carried out by heating it at 350° C. for 1 hour. The Pt was loaded in a loading amount of 3 g per 1-liter apparent volume of the catalyst-support substrate. This Pt carries out the combustion of particulates as a catalytic component.

And, a Ba acetate aqueous solution including Ba in an amount of 50 g/L was prepared, and the catalyst-support substrate with the slurry coated was immersed into it, and was dried and calcined after taking it up therefrom. The calcination was carried out by heating it at 500° C. for 1 hour. The Ba was loaded in a loading amount of 13.7 g (0.1 mol) per 1-liter apparent volume of the catalyst-support substrate. Note that this Ba works as a NOx sorbing component in filter catalysts.

In accordance with the above procedures, a filter catalyst of Example No. 3 was produced.

Comparative Example No. 1

150-g alumina powder and 200-g water were weighed. The alumina powder was charged into the water and dispersed therein by stirring, and was subjected to wet milling, thereby preparing a slurry. When the entire alumina powder was taken as 100% by weight, particles whose particle diameters were 1 μm or less became 77%.

The slurry was coated onto the same catalyst-support substrate as the one used in Example No. 1. The coating of the slurry onto the catalyst-support substrate was carried out by immersing the catalyst-support substrate into the coating slurry, removing the excessive slurry after taking it up therefrom, and thereafter drying and calcining it. Note that, in the present comparative example, the removal of the excessive slurry was done by repeating an air blowing, in which a pressurized air is sprayed into cells. This air blowing was repeated until the slurry applied on the catalyst-support substrate became a predetermined weight. Note that, during the production of the present comparative example, the air blowing was done three times. Moreover, the calcination was carried out by heating it at 500° C. for 1 hour.

When the weight of the catalyst-support substrate with the slurry coated was weighed, the alumina was loaded in a loading amount of 150 g per 1-liter apparent volume of the catalyst-support substrate.

And, a Pt nitrate aqueous solution including Pt in an amount of 1.5 g/L was prepared, and the catalyst-support substrate with the slurry coated was immersed into it, and was dried after taking it up therefrom. The drying was carried out by heating it at 350° C. for 1 hour. The Pt was loaded in a loading amount of 3 g per 1-liter apparent volume of the catalyst-support substrate. This Pt carries out the combustion of particulates as a catalytic component.

And, a Ba acetate aqueous solution including Ba in an amount of 50 g/L was prepared, and the catalyst-support substrate with the slurry coated was immersed into it, and was dried and calcined after taking it up therefrom. The calcination was carried out by heating it at 500° C. for 1 hour. The Ba was loaded in a loading amount of 13.7 g (0.1 mol) per 1-liter apparent volume of the catalyst-support substrate. Note that this Ba works as a NOx sorbing component in filter catalysts.

In accordance with the above procedures, a filter catalyst of Comparative Example No. 1 was produced.

Comparative Example No. 2

150-g alumina powder and 200-g water were weighed. The alumina powder was charged into the water and dispersed therein by stirring, and was subjected to wet milling, thereby preparing a slurry. When the entire alumina powder was taken as 100% by weight, particles whose particle diameters were 1 μm or less became 10%.

The slurry was coated onto the same catalyst-support substrate as the one used in Example No. 1. The coating of the slurry onto the catalyst-support substrate was carried out by immersing the catalyst-support substrate into the slurry, removing the excessive slurry after taking it up therefrom, and thereafter drying and calcining it. Note that, in the present comparative example, the removal of the excessive slurry was done by repeating an air blowing in the same manner as that of Comparative Example No. 1. This air blowing was repeated until the slurry applied on the catalyst-support substrate became a predetermined weight. Note that, during the production of the present comparative example, the air blowing was done three times. Moreover, the calcination was carried out by heating it at 500° C. for 1 hour.

When the weight of the catalyst-support substrate with the slurry coated was weighed, the alumina was loaded in a loading amount of 150 g per 1-liter apparent volume of the catalyst-support substrate.

And, a Pt nitrate aqueous solution including Pt in an amount of 1.5 g/L was prepared, and the catalyst-support substrate with the slurry coated was immersed into it, and was dried after taking it up therefrom. The drying was carried out by heating it at 350° C. for 1 hour. The Pt was loaded in a loading amount of 3 g per 1-liter apparent volume of the catalyst-support substrate. This Pt carries out the combustion of particulates as a catalytic component.

And, a Ba acetate aqueous solution including Ba in an amount of 50 g/L was prepared, and the catalyst-support substrate with the slurry coated was immersed into it, and was dried and calcined after taking it up therefrom. The calcination was carried out by heating it at 500° C. for 1 hour. The Ba was loaded in a loading amount of 13.7 g (0.1 mol) per 1-liter apparent volume of the catalyst-support substrate. Note that this Ba works as a NOx sorbing component in filter catalysts.

In accordance with the above procedures, a filter catalyst of Comparative Example No. 2 was produced.

Comparative Example No. 3

75-g alumina powder and 200-g water were weighed. The alumina powder was charged into the water and dispersed therein by stirring, and was subjected to wet milling, thereby preparing a slurry. When the entire alumina powder was taken as 100% by weight, particles whose particle diameters were 1 μm or less became 77%.

The slurry was coated onto the same catalyst-support substrate as the one used in Example No. 1. The coating of the slurry onto the catalyst-support substrate was carried out by immersing the catalyst-support substrate into the slurry, removing the excessive slurry after taking it up therefrom, and thereafter drying and calcining it. Note that, in the present comparative example, the removal of the excessive slurry was done by repeating an air blowing in the same manner as that of Comparative Example No. 1. This air blowing was repeated until the slurry applied on the catalyst-support substrate became a predetermined weight. Note that, during the production of the present comparative example, the air blowing was done four times. Moreover, the calcination was carried out by heating it at 500° C. for 1 hour.

When the weight of the catalyst-support substrate with the slurry coated was weighed, the alumina was loaded in a loading amount of 75 g per 1-liter apparent volume of the catalyst-support substrate.

And, a Pt nitrate aqueous solution including Pt in an amount of 1.5 g/L was prepared, and the catalyst-support substrate with the slurry coated was immersed into it, and was dried after taking it up therefrom. The drying was carried out by heating it at 350° C. for 1 hour. The Pt was loaded in a loading amount of 3 g per 1-liter apparent volume of the catalyst-support substrate. This Pt carries out the combustion of particulates as a catalytic component.

And, a Ba acetate aqueous solution including Ba in an amount of 50 g/L was prepared, and the catalyst-support substrate with the slurry coated was immersed into it, and was dried and calcined after taking it up therefrom. The calcination was carried out by heating it at 500° C. for 1 hour. The Ba was loaded in a loading amount of 13.7 g (0.1 mol) per 1-liter apparent volume of the catalyst-support substrate. Note that this Ba works as a NOx sorbing component in filter catalysts.

In accordance with the above procedures, a filter catalyst of Comparative Example No. 3 was produced.

Example No. 4

Except that the alumina powder in which the particle-diameter distribution is restricted was used, a filter catalyst of the present example was produced in the same manner as that of Example No. 1.

First of all, 150-g alumina ($Al_2O_3$) powder and 200-g water were weighed. The alumina powder was charged into the water and dispersed therein by stirring, and was subjected to wet milling, thereby preparing a slurry. When a particle size distribution of the alumina powder was measured, D70 was 0.88 μm.

The measurement of the particle size distribution was carried out using a particle-size measuring apparatus (produced by HORIBA, Ltd., Name of Article: LA-500). The measurement by the particle-size distribution measuring apparatus was carried out after preparing a suspension, in which 0.1-g sample was suspended in about-300-ml pure water, irradiating an ultrasonic wave to this suspension for 10 minutes and dispersing the measurement sample sufficiently.

Subsequently, the slurry was coated onto the same catalyst-support substrate as the one used in Example No. 1. The coating of the slurry onto the catalyst-support substrate was carried out by immersing the catalyst-support substrate into the slurry, removing the excessive slurry after taking it up therefrom, and thereafter drying and calcining it. Note that, in the present example, the removal of the excessive slurry was done by repeating a pressure fluctuation, in which the slurry was suctioned by holding it in such a state that one of the opposite ends was adapted to the atmospheric pressure and the other one of the opposite ends was adapted to a pressure of (the atmospheric pressure—10 KPa) so that the pressure difference between both opposite ends became 10 KPa for 5-30 seconds; and thereafter holding it for 5-30 seconds after putting the pressure of the other one of the opposite ends back to the atmospheric pressure side. This pressure fluctuation was repeated until the slurry applied on the catalyst-support substrate became a predetermined weight. Note that, during the production of the present example, since the suction of the slurry was carried out through the respective opposite-end sides of both opposite ends, the pressure fluctuation was done twice. Moreover, the calcination was carried out by heating it at 500° C. for 1 hour.

When the weight of the catalyst-support substrate with the slurry coated was weighed, the alumina was loaded in a loading amount of 150 g per 1-liter apparent volume of the catalyst-support substrate.

And, a Pt nitrate aqueous solution including Pt in an amount of 1.5 g/L was prepared, and the catalyst-support substrate with the slurry coated was immersed into it, and was dried after taking it up therefrom. The drying was carried out by heating it at 350° C. for 1 hour. The Pt was loaded in a loading amount of 3 g per 1-liter apparent volume of the catalyst-support substrate. This Pt carries out the combustion of particulates as a catalytic component.

And, a Ba acetate aqueous solution including Ba in an amount of 50 g/L was prepared, and the catalyst-support substrate with the slurry coated was immersed into it, and was dried and calcined after taking it up therefrom. The calcination was carried out by heating it at 500° C. for 1 hour. The Ba was loaded in a loading amount of 13.7 g (0.1 mol) per 1-liter apparent volume of the catalyst-support substrate. Note that this Ba works as a NOx sorbing component in filter catalysts.

In accordance with the above procedures, a filter catalyst of Example No. 4 was produced.

Example No. 5

Except that the titania powder in which the particle-diameter distribution is restricted was used, a filter catalyst of the present example was produced in the same manner as that of Example No. 2.

First of all, 150-g titania powder and 200-g water were weighed. The titania powder was charged into the water and dispersed therein by stirring, and was subjected to wet milling, thereby preparing a slurry. When a particle size distribution of the titania powder was measured, D70 was 0.92 μm.

The slurry was coated onto the same catalyst-support substrate as the one used in Example No. 1. The coating of the slurry onto the catalyst-support substrate was carried out by immersing the catalyst-support substrate into the slurry, removing the slurry after taking it up therefrom, and thereafter drying and calcining it. Note that, in the present example, the removal of the excessive slurry was done by repeating a pressure fluctuation, in which the slurry was suctioned by holding it in such a state that one of the opposite ends was adapted to the atmospheric pressure and the other one of the opposite ends was adapted to a pressure of (the atmospheric pressure—10 KPa) so that the pressure difference between both opposite ends became 10 KPa for 5-30 seconds; and thereafter holding it for 5-30 seconds after putting the pressure of the other one of the opposite ends back to the atmospheric pressure. This pressure fluctuation was repeated until the slurry applied on the catalyst-support substrate became a predetermined weight. Note that, during the production of the present example, the pressure fluctuation was done twice similarly to the instance of Example No. 1. Moreover, the calcination was carried out by heating it at 500° C. for 1 hour.

When the weight of the catalyst-support substrate with the slurry coated was weighed, it was increased by 5.3 g more than prior to the coating of the slurry. That is, the titania was loaded in a loading amount of 150 g per 1-liter apparent volume of the catalyst-support substrate.

And, a Pt nitrate aqueous solution including Pt in an amount of 1.5 g/L was prepared, and the catalyst-support substrate with the slurry coated was immersed into it, and was dried after taking it up therefrom. The drying was carried out by heating it at 350° C. for 1 hour. The Pt was loaded in a loading amount of 3 g per 1-liter apparent volume of the catalyst-support substrate. This Pt carries out the combustion of particulates as a catalytic component.

And, a Ba acetate aqueous solution including Ba in an amount of 50 g/L was prepared, and the catalyst-support substrate with the slurry coated was immersed into it, and was dried and calcined after taking it up therefrom. The calcination was carried out by heating it at 500° C. for 1 hour. The Ba was loaded in a loading amount of 13.7 g (0.1 mol) per 1-liter apparent volume of the catalyst-support substrate. Note that this Ba works as a NOx sorbing component in filter catalysts.

In accordance with the above procedures, a filter catalyst of Example No. 5 was produced.

Example No. 6

Except that the alumina powder in which the particle-diameter distribution is restricted was used, a filter catalyst of the present example was produced in the same manner as that of Example No. 3.

First of all, 150-g alumina powder and 200-g water were weighed. The alumina powder was charged into the water and was dispersed therein by stirring, and was subjected to wet milling, thereby preparing a slurry. When a particle size distribution of the alumina powder was measured, D70 was 0.88 μm.

The slurry was coated onto the same catalyst-support substrate as the one used in Example No. 1. The coating of the slurry onto the catalyst-support substrate was carried out by immersing the catalyst-support substrate into the slurry, removing the excessive slurry after taking it up therefrom, and thereafter drying and calcining it. Note that, in the present example, the removal of the excessive slurry was done by repeating a pressure fluctuation, in which the slurry was suctioned by holding it in such a state that one of the opposite ends was adapted to the atmospheric pressure and the other one of the opposite ends was adapted to a pressure of (the atmospheric pressure—10 KPa) so that the pressure difference between both opposite ends became 10 KPa for 5-30 seconds; and thereafter holding it for 5-30 seconds after putting the pressure of the other one of the opposite ends back to the atmospheric pressure. This pressure fluctuation was repeated until the slurry applied on the catalyst-support substrate became a predetermined weight. Note that, during the production of the present example, the pressure fluctuation was done four times. Moreover, the calcination was carried out by heating it at 500° C. for 1 hour.

When the weight of the catalyst-support substrate with the slurry coated was weighed, it was increased by 2.6 g more than prior to the coating of the slurry. That is, the alumina was loaded in a loading amount of 75 g per 1-liter apparent volume of the catalyst-support substrate.

And, a Pt nitrate aqueous solution including Pt in an amount of 1.5 g/L was prepared, and the catalyst-support substrate with the slurry coated was immersed into it, and was dried after taking it up therefrom. The drying was carried out by heating it at 350° C. for 1 hour. The Pt was loaded in a loading amount of 3 g per 1-liter apparent volume of the catalyst-support substrate. This Pt carries out the combustion of particulates as a catalytic component.

And, a Ba acetate aqueous solution including Ba in an amount of 50 g/L was prepared, and the catalyst-support substrate with the slurry coated was immersed into it, and was dried and calcined after taking it up therefrom. The calcination was carried out by heating it at 500° C. for 1 hour. The Ba was loaded in a loading amount of 13.7 g (0.1 mol) per 1-liter apparent volume of the catalyst-support substrate. Note that this Ba works as a NOx sorbing component in filter catalysts.

In accordance with the above procedures, a filter catalyst of Example No. 6 was produced.

Comparative Example No. 4

150-g alumina powder and 200-g water were weighed. The alumina powder was charged into the water and dispersed therein by stirring, and was subjected to wet milling, thereby preparing a slurry. When a particle size distribution of the alumina powder was measured, D70 was 1.5 μm.

The slurry was coated onto the same catalyst-support substrate as the one used in Example No. 1. The coating of the slurry onto the catalyst-support substrate was carried out by immersing the catalyst-support substrate into the coating slurry, removing the excessive slurry after taking it up therefrom, and thereafter drying and calcining it. Note that, in the present comparative example, the removal of the excessive slurry was done by repeating an air blowing, in which a pressurized air is sprayed into cells. This air blowing was repeated until the slurry applied on the catalyst-support substrate became a predetermined weight. Note that, during the production of the present comparative example, the air blowing was done three times. Moreover, the calcination was carried out by heating it at 500° C. for 1 hour.

When the weight of the catalyst-support substrate with the slurry coated was weighed, the alumina was loaded in a loading amount of 150 g per 1-liter apparent volume of the catalyst-support substrate.

And, a Pt nitrate aqueous solution including Pt in an amount of 1.5 g/L was prepared, and the catalyst-support substrate with the slurry coated was immersed into it, and was dried after taking it up therefrom. The drying was carried out by heating it at 350° C. for 1 hour. The Pt was loaded in a loading amount of 3 g per 1-liter apparent volume of the catalyst-support substrate. This Pt carries out the combustion of particulates as a catalytic component.

And, a Ba acetate aqueous solution including Ba in an amount of 50 g/L was prepared, and the catalyst-support substrate with the slurry coated was immersed into it, and was dried and calcined after taking it up therefrom. The calcination was carried out by heating it at 500° C. for 1 hour. The Ba was loaded in a loading amount of 13.7 g (0.1 mol) per 1-liter apparent volume of the catalyst-support substrate. Note that this Ba works as a NOx sorbing component in filter catalysts.

In accordance with the above procedures, a filter catalyst of Comparative Example No. 4 was produced.

Comparative Example No. 5

150-g alumina powder and 200-g water were weighed. The alumina powder was charged into the water and dispersed therein by stirring, and was subjected to wet milling, thereby preparing a slurry. When a particle size distribution of the alumina powder was measured, D70 was 3.8 µm.

The slurry was coated onto the same catalyst-support substrate as the one used in Example No. 1. The coating of the slurry onto the catalyst-support substrate was carried out by immersing the catalyst-support substrate into the slurry, removing the excessive slurry after taking it up therefrom, and thereafter drying and calcining it. Note that, in the present comparative example, the removal of the excessive slurry was done by repeating an air blowing in the same manner as Comparative Example No. 1. This air blowing was repeated until the slurry applied on the catalyst-support substrate became a predetermined weight. Note that, during the production of the present comparative example, the air blowing was done three times. Moreover, the calcination was carried out by heating it at 500° C. for 1 hour.

When the weight of the catalyst-support substrate with the slurry coated was weighed, the alumina was loaded in a loading amount of 150 g per 1-liter apparent volume of the catalyst-support substrate.

And, a Pt nitrate aqueous solution including Pt in an amount of 1.5 g/L was prepared, and the catalyst-support substrate with the slurry coated was immersed into it, and was dried after taking it up therefrom. The drying was carried out by heating it at 350° C. for 1 hour. The Pt was loaded in a loading amount of 3 g per 1-liter apparent volume of the catalyst-support substrate. This Pt carries out the combustion of particulates as a catalytic component.

And, a Ba acetate aqueous solution including Ba in an amount of 50 g/L was prepared, and the catalyst-support substrate with the slurry coated was immersed into it, and was dried and calcined after taking it up therefrom. The calcination was carried out by heating it at 500° C. for 1 hour. The Ba was loaded in a loading amount of 13.7 g (0.1 mol) per 1-liter apparent volume of the catalyst-support substrate. Note that this Ba works as a NOx sorbing component in filter catalysts.

In accordance with the above procedures, a filter catalyst of Comparative Example No. 5 was produced.

Comparative Example No. 6

75-g alumina powder and 200-g water were weighed. The alumina powder was charged into the water and dispersed therein by stirring, and was subjected to wet milling, thereby preparing a slurry. When a particle size distribution of the alumina powder was measured, D70 was 1.5 µm.

The slurry was coated onto the same catalyst-support substrate as the one used in Example No. 1. The coating of the slurry onto the catalyst-support substrate was carried out by immersing the catalyst-support substrate into the slurry, removing the excessive slurry after taking it up therefrom, and thereafter drying and calcining it. Note that, in the present comparative example, the removal of the excessive slurry was done by repeating an air blowing in the same manner as that of Comparative Example No. 1. This air blowing was repeated until the slurry applied on the catalyst-support substrate became a predetermined weight. Note that, during the production of the present comparative example, the air blowing was done four times. Moreover, the calcination was carried out by heating it at 500° C. for 1 hour.

When the weight of the catalyst-support substrate with the slurry coated was weighed, the alumina was loaded in a loading amount of 75 g per 1-liter apparent volume of the catalyst-support substrate.

And, a Pt nitrate aqueous solution including Pt in an amount of 1.5 g/L was prepared, and the catalyst-support substrate with the slurry coated was immersed into it, and was dried after taking it up therefrom. The drying was carried out by heating it at 350° C. for 1 hour. The Pt was loaded in a loading amount of 3 g per 1-liter apparent volume of the catalyst-support substrate. This Pt carries out the combustion of particulates as a catalytic component.

And, a Ba acetate aqueous solution including Ba in an amount of 50 g/L was prepared, and the catalyst-support substrate with the slurry coated was immersed into it, and was dried and calcined after taking it up therefrom. The calcination was carried out by heating it at 500° C. for 1 hour. The Ba was loaded in a loading amount of 13.7 g (0.1 mol) per 1-liter apparent volume of the catalyst-support substrate. Note that this Ba works as a NOx sorbing component in filter catalysts.

In accordance with the above procedures, a filter catalyst of Comparative Example No. 6 was produced.

Evaluation

The pore structures of the filter catalysts of Examples Nos. 1-3 and Comparative Examples Nos. 1-3 were measured using a mercury porosi-meter (produced by SHIMADZU CORPORATION, name of article: Autopore 9200). The measurement results of the filter catalysts of Examples Nos. 1-3 and Comparative Examples Nos. 1-3 are set forth in Table 1, and the measurement results of the filter catalysts of Examples Nos. 4-6 and Comparative Examples Nos. 4-6 are set forth in Table 2. Note that the operation of the mercury porosi-meter was carried out by increasing the mercury penetration pressure between 0-200 MPa in the measurement of the pore structures.

| | Porosity in Pore Diameter (%) | | | | | | | | | Pressure |
|---|---|---|---|---|---|---|---|---|---|---|
| | 1~5 (µm) | 5~10 (µm) | 10~20 (µm) | Total of 1~20 (µm) | 20~40 (µm) | 40~70 (µm) | 70~150 (µm) | 150~200 (µm) | Total of 1~200 µm | Loss (KPa) |
| Ex. #1 | 2.9 | 2.52 | 7.84 | 13.26 | 19.25 | 9.02 | 3.97 | 0.95 | 46.45 | 2.6 |
| Ex. #2 | 2.7 | 3.87 | 8.23 | 14.8 | 20.65 | 9.34 | 3.78 | 0.88 | 49.45 | 2.5 |
| Ex. #3 | 3.87 | 4.32 | 9.55 | 17.74 | 24.55 | 9.45 | 4.12 | 0.79 | 56.65 | 2.2 |
| Comp. Ex. #1 | 1.1 | 1.82 | 7.70 | 10.51 | 22.36 | 9.86 | 4.42 | 1.02 | 48.28 | 3.2 |

-continued

|  | Porosity in Pore Diameter (%) | | | | | | | | Pressure |
|---|---|---|---|---|---|---|---|---|---|
|  | 1~5 (μm) | 5~10 (μm) | 10~20 (μm) | Total of 1~20 (μm) | 20~40 (μm) | 40~70 (μm) | 70~150 (μm) | 150~200 (μm) | Total of 1~200 μm | Loss (KPa) |
| Comp. Ex. #2 | 1.07 | 1.71 | 8.08 | 10.86 | 25.46 | 10.73 | 4.96 | 0 | 52.01 | 3.5 |
| Comp. Ex. #3 | 0.99 | 1.76 | 8.14 | 10.89 | 26.88 | 11.22 | 5.89 | 0.99 | 55.87 | 3.1 |

|  | Porosity in Pore Diameter (%) | | | | | | | | Pressure |
|---|---|---|---|---|---|---|---|---|---|
|  | 1~5 (μm) | 5~10 (μm) | 10~20 (μm) | Total of 1~20 (μm) | 20~40 (μm) | 40~70 (μm) | 70~150 (μm) | 150~200 (μm) | Total of 1~200 μm | Loss (KPa) |
| Ex. #4 | 2.7 | 2.41 | 7.56 | 12.67 | 18.30 | 8.91 | 3.87 | 0.93 | 44.68 | 2.5 |
| Ex. #5 | 2.8 | 3.75 | 8.02 | 14.57 | 20.02 | 9.24 | 3.65 | 0.83 | 48.31 | 2.3 |
| Ex. #6 | 3.6 | 4.21 | 9.40 | 17.21 | 25.10 | 9.73 | 4.30 | 0.85 | 57.19 | 2.2 |
| Comp. Ex. #4 | 1.2 | 1.67 | 7.53 | 10.4 | 22.40 | 9.78 | 4.30 | 1.05 | 47.93 | 3.1 |
| Comp. Ex. #5 | 1.1 | 1.65 | 8.0 | 10.75 | 25.10 | 10.2 | 4.80 | 0.10 | 50.95 | 3.4 |
| Comp. Ex. #6 | 0.95 | 1.70 | 8.20 | 10.85 | 26.30 | 11.10 | 5.75 | 0.89 | 54.89 | 3.1 |

Figure 2:
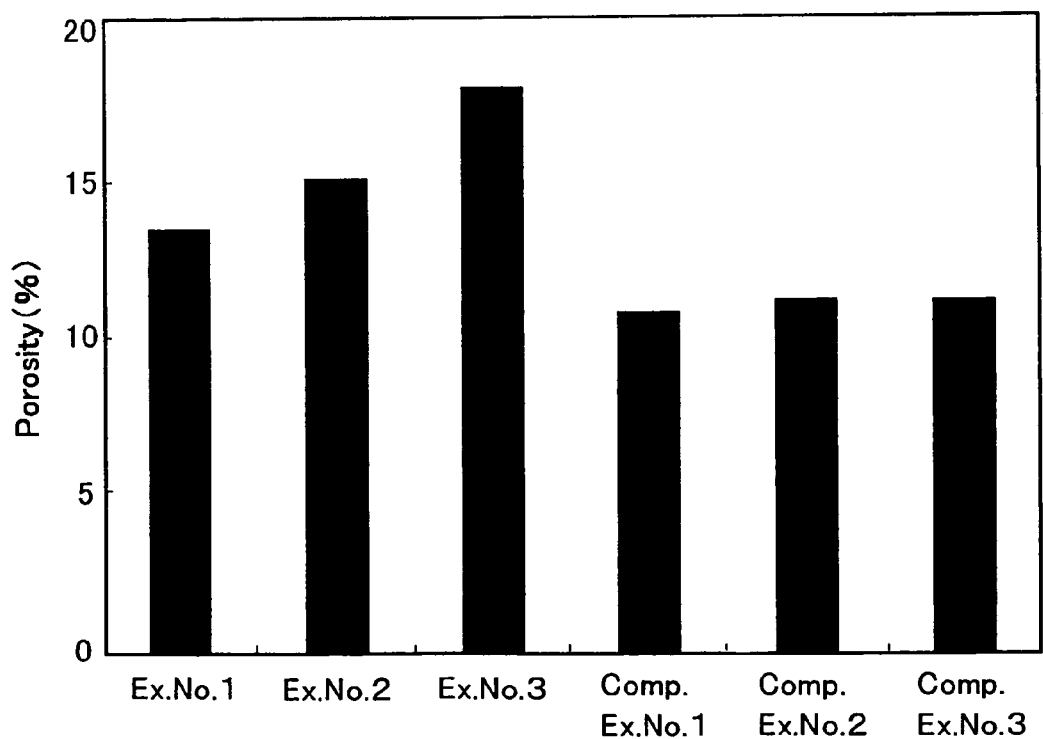
FIG. 2 is a graph for illustrating the porosity of pore diameters of 1-20 μm of the filter catalysts of Example Nos. 1-3 and Comparative Example Nos. 1-3.
Figure 3:
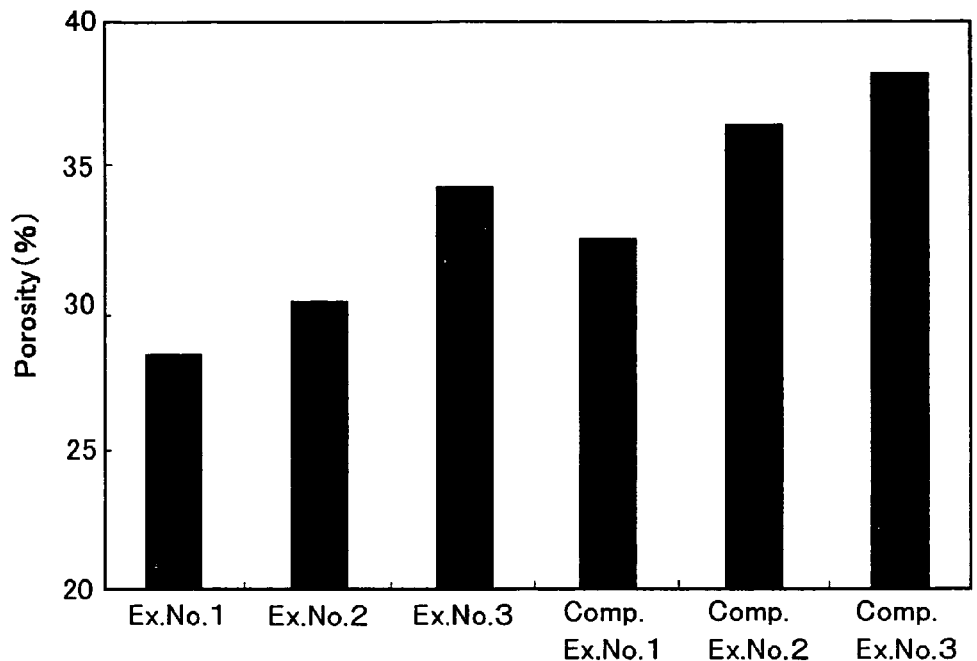
FIG. 3 is a graph for illustrating the porosity of pore diameters of 20-70 μm of the filter catalysts of Example Nos. 1-3 and Comparative Example Nos. 1-3.

The porosities of the filter catalysts of the examples and comparative examples set forth in Table 1 are separated at 20 μm or less and 20 μm or more, and are illustrated in FIGS. 2 and 3. In FIG. 2, there are shown the porosities of 1-to-20-μm pore diameters, and, in FIG. 3, there are shown the porosities of 20-to-70-μm pore diameters.

From Table 1 and both drawings, it is understood the filter catalyst of Examples 1-3 are such that pores of 1-to-20-μm diameters are present abundantly, but pores of 20-to-70-μm diameters are less. Moreover, as in the filter catalyst of Example No. 3, pores of 1-to-20-μm diameters are present abundantly, even when the loading amount of the catalytic layer (the coating amount of the slurry) is reduced. Also, the same can be confirmed from Table 2 as well.

Figure 4:
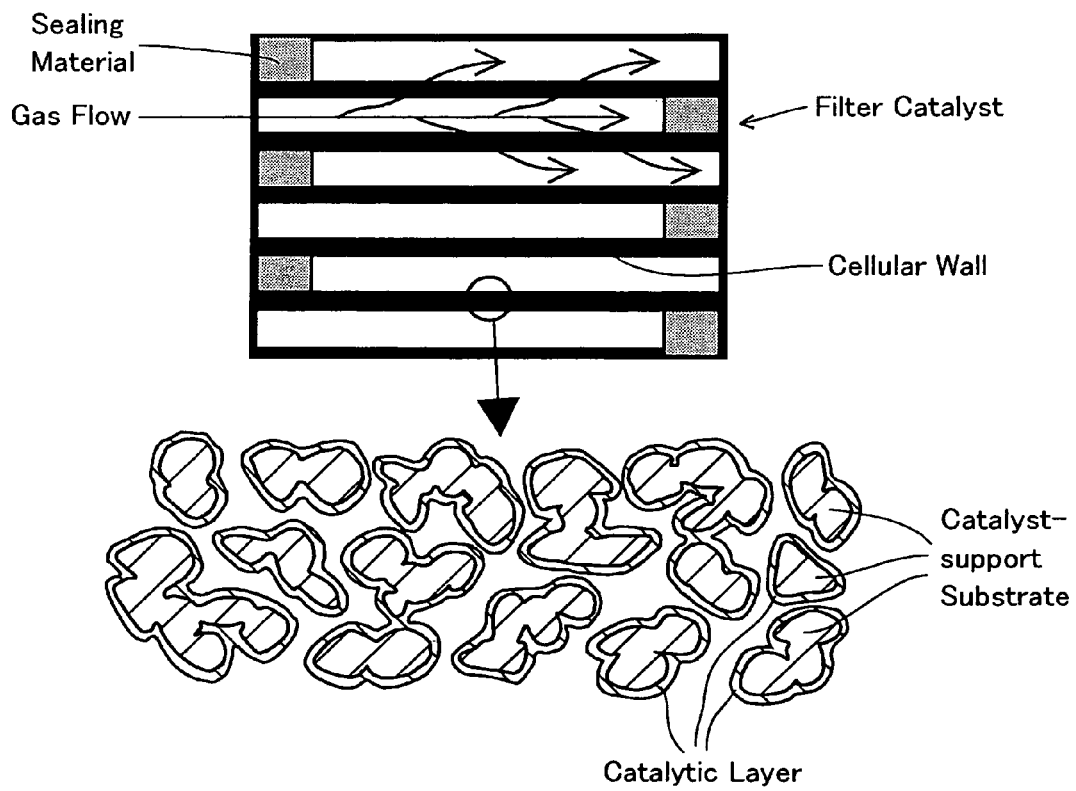
FIG. 4 is an enlarged cross-sectional diagram of a filter catalyst of Example No. 1.

Specifically, the filter catalysts of Examples 1-6 are such that uniform-thickness catalytic layers are formed even inside the pores regardless of the sizes of the pores in the catalyst-support substrate as shown in FIG. 4. Thus, the pores of 1-to-20-μm diameters in the catalyst-support substrate are such that the pore diameters are made smaller by the catalytic layers, and the pores of 20-μm-or-more diameters in the catalyst-support substrate are such that the pore diameters are made smaller by the catalytic layers so that they have turned into pores of 20-μm-or-more diameters.

On the contrary, the filter catalysts of the respective comparative examples are such that pores of 1-to-20-μm diameters are less, but pores of 20-to-70-μm diameters are present abundantly.

Figure 5:
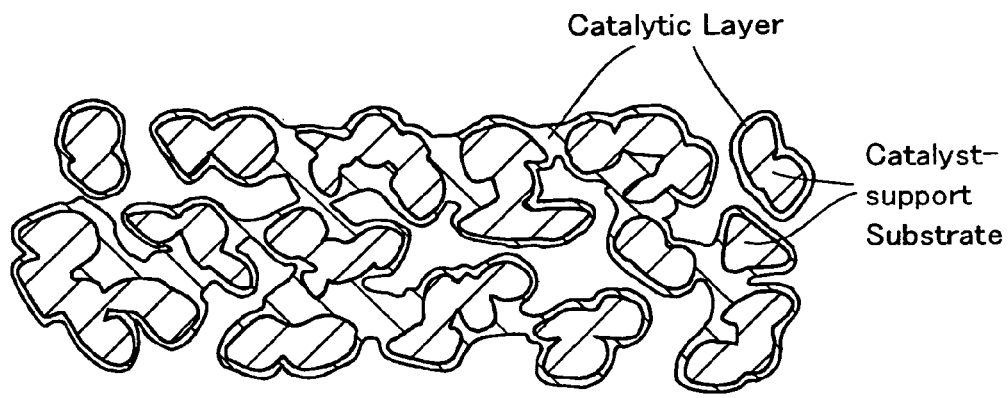
FIG. 5 is an enlarged cross-sectional diagram of a filter catalyst of Comparative Example No. 1.
Figure 6:
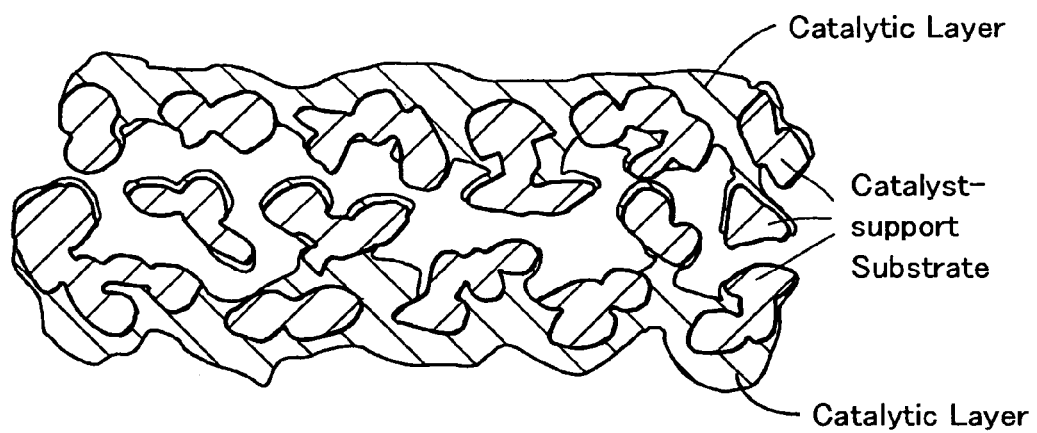
FIG. 6 is an enlarged cross-sectional diagram of a filter catalyst of Comparative Example No. 2.

Specifically, the filter catalyst of Comparative Example Nos. 1, 3, 4 and 6 are such that the pores of 1-to-20-μm diameters in the catalyst-support substrate are such that the pores are closed by the catalytic layer, and the pores of 20-μm-or-more diameters in the catalyst-support substrate have remained as the pores of 20-μm-or-more diameters because the catalytic layer is thin, as shown in FIG. 5. Further, the filter catalyst of Comparative Example Nos. 2 and 5 are such that the pores of 1-to-20-μm diameters in the catalyst-support substrate are such that the pores are closed by the catalytic layer, which are formed at their openings, and the pores of 20-μm-or-more diameters in the catalyst-support substrate have remained as the pores of 20-μm-or-more diameters, though the catalytic layer is present at their openings, as shown in FIG. 6. Note that FIG. 5 and FIG. 6 are diagrams which illustrate the same cross section as the enlarged cross-sectional diagram of the cellular walls in FIG. 4.

Measurement of Pressure Loss

Subsequently, the measurement of the pressure losses of the filter catalysts of the examples and comparative examples was carried out.

Figure 7:
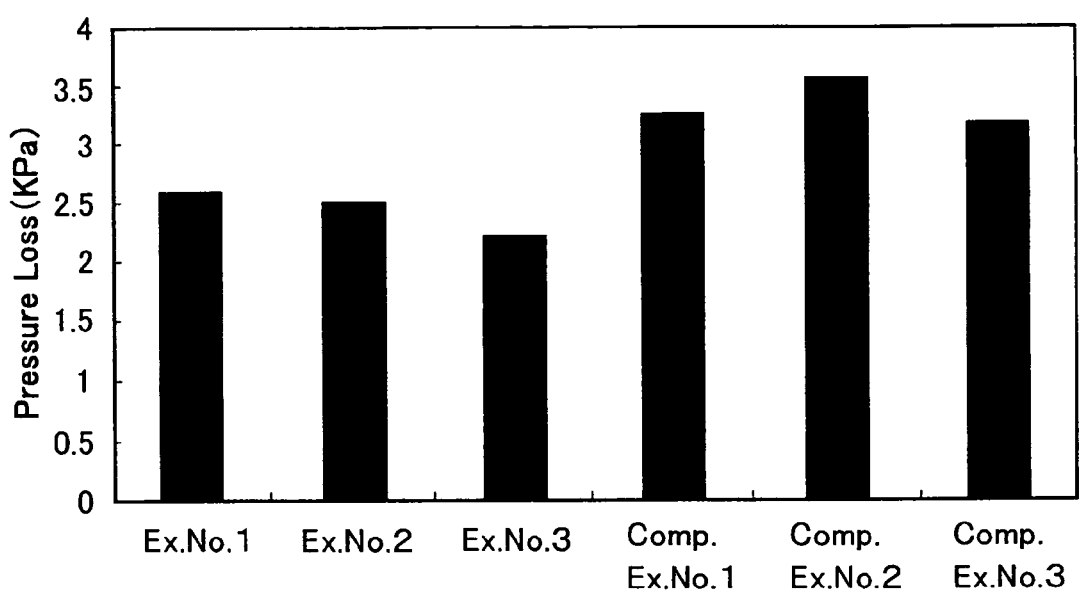
FIG. 7 is a graph for illustrating the measurement results of the pressure losses of the filter catalysts of Example Nos. 1-3 and Comparative Example Nos. 1-3.

First of all, the filter catalysts were put into place in an exhaust system of a vehicle which had a 2-liter-displacement turbocharger-type direct-injection diesel engine. And, a steady operation was carried out for 2 hours at a revolution speed of 2,000 rpm and with a torque of 30 N·m. Under this steady operation, particulates were deposited in an amount of 4 g per 1-liter apparent volume of the filter catalysts. After that the filter catalysts with particulates being deposited were taken out and put into place in a model gas apparatus in which nitrogen gas flows, then the pressure losses were measured from the measurement values of the pressure sensors installed in front of and at the rear of the filter catalysts by flowing nitrogen gas heated at 100° C. at a volume of 30 liter per minute, and the measurement results are illustrated in FIG. 7 and Tables 1-2 all together. The measurement results of Example Nos. 1-3 and Comparative Example Nos. 1-3 are illustrated in FIG. 7 and Table 1, and the measurement results of Example Nos. 4-6 and Comparative Example Nos. 4-6 are illustrated in Table 2. Note that the pressure losses were found from the differences of the pressures which were measured at the two pressure sensors in front of and at the rear of the filter catalysts.

From FIG. 7 and Tables 1-2, it was confirmed that the filter catalysts of the respective examples were such that the pressure losses became lower, compared with the filter catalysts of the respective comparative examples. That is, the filter catalysts of the respective examples are such that the permeable holes, which are completed by continuing the pores and through which exhaust gases pass, have remained. On the other hand, the filter catalysts of the respective comparative examples are such that the permeable holes are closed by the catalytic layer and the deposited particulates further close the permeable holes to raise the pressure losses.

And, by forming the loading layer using the alumina or titania powder in which particles whose particle diameters are 1 μm or less is contained by 70% by weight or more, it is understood that the filter catalyst became the filter catalyst in which the rise of the pressure loss is inhibited. Moreover, by forming the loading layer using the alumina or titania powder in which D70 is 1 μm or less, it is understood that the filter catalyst became the filter catalyst in which the rise of the pressure loss is inhibited.

Since the filter catalysts of the respective examples described above are such that the pressure-loss rise resulting from the deposition of particulates are small, they can capture the particulates without exerting high loads to diesel engines. Accordingly, they have an effect of being capable of capturing and processing the particulates in a much greater amount.

The invention claimed is:

1. A filter catalyst comprising:
    a catalyst-support substrate composed of a heat-resistant porous structure having chained pores; and
    a catalytic layer for burning particulates and formed on a surface of said catalyst-support substrate,
    wherein said filter catalyst has pores of 1-20 μm in a porosity of 11% or more.

2. The filter catalyst as set forth in claim 1, wherein said catalytic layer has a loading layer formed by preparing a slurry of a heat-resistant oxide powder, coating said slurry onto said catalyst-support substrate, and drying and calcining said slurry; and the heat-resistant oxide powder whose particle diameters are 1 μm or less is contained by 70% by weight or more when the entire amount of the powder dispersed in said slurry is taken as 100% by weight.

3. The filter catalyst as set forth in claim 1, wherein said catalytic layer has a loading layer formed by preparing a slurry of a heat-resistant oxide powder, coating said slurry onto said catalyst-support substrate, and drying and calcining said slurry; wherein said heat-resistant oxide powder dispersed in said slurry is such that a 70% particle-diameter value (D70) of a particle-diameter cumulative distribution is 1 μm or less.

* * * * *